United States Patent [19]

Nanda

[11] Patent Number: 4,797,852
[45] Date of Patent: Jan. 10, 1989

[54] BLOCK SHIFTER FOR GRAPHICS PROCESSOR

[75] Inventor: Sunil Nanda, Santa Cruz, Calif.

[73] Assignee: Intel Corporation, Santa Clara, Calif.

[21] Appl. No.: 825,652

[22] Filed: Feb. 3, 1986

[51] Int. Cl.⁴ .................... G06F 7/00; G11C 19/00
[52] U.S. Cl. ....................... 364/900; 382/41; 382/46; 370/112; 340/727
[58] Field of Search ... 364/200 MS File, 900 MS File, 364/521, 715, 731; 382/41; 340/799, 731, 172.5

[56] References Cited

U.S. PATENT DOCUMENTS

| | | | |
|---|---|---|---|
| 3,582,899 | 6/1971 | Semmelhaack | 364/200 |
| 3,815,095 | 6/1974 | Wester | 364/200 |
| 3,914,744 | 10/1975 | Brown | 364/900 |
| 3,934,132 | 1/1976 | Desmonds | 364/900 |
| 3,961,750 | 6/1976 | Dao | 364/900 |
| 3,979,728 | 9/1976 | Reddaway | 340/172.5 |
| 4,122,534 | 10/1978 | Cesaratto | 364/900 |
| 4,128,872 | 12/1978 | Prioste | 364/900 |
| 4,314,349 | 2/1982 | Batcher | 364/900 |
| 4,345,316 | 8/1982 | Hirotani et al. | 364/715 |
| 4,383,304 | 5/1983 | Hirashima | 364/715 |
| 4,396,994 | 8/1983 | Kang et al. | 364/715 |
| 4,437,166 | 3/1984 | O'Brien | 364/900 |
| 4,472,788 | 9/1984 | Yamazaki | 364/715 |
| 4,475,173 | 10/1984 | Taloni | 364/715 |
| 4,509,187 | 4/1985 | Ackland et al. | 364/200 |
| 4,512,018 | 4/1985 | Phelps et al. | 370/112 |
| 4,524,455 | 6/1985 | Holsztynski et al. | 382/41 |
| 4,533,993 | 8/1985 | McCanny et al. | 364/200 |
| 4,541,114 | 9/1985 | Rutenbar et al. | 382/41 |
| 4,550,437 | 10/1985 | Kobayashi et al. | 382/41 |
| 4,574,394 | 3/1986 | Holsztynski et al. | 382/41 |
| 4,583,197 | 4/1986 | Chappell et al. | 364/900 |
| 4,593,278 | 6/1986 | Koos, Jr. et al. | 340/731 |
| 4,616,220 | 10/1986 | Grunewald et al. | 340/728 |
| 4,627,020 | 12/1986 | Anderson et al. | 364/900 |
| 4,636,783 | 1/1987 | Omachi | 340/799 |
| 4,636,976 | 1/1987 | Takla | 364/715 |
| 4,644,503 | 2/1987 | Bantz et al. | 364/521 |
| 4,653,019 | 3/1987 | Hodge et al. | 364/900 |
| 4,665,538 | 5/1987 | Machida | 364/715 |
| 4,667,308 | 5/1987 | Hayes et al. | 364/900 |
| 4,674,064 | 6/1987 | Vaughn | 364/900 |

FOREIGN PATENT DOCUMENTS

| | | | |
|---|---|---|---|
| 0025133 | 2/1979 | Japan | 364/715 |
| 0169681 | 10/1983 | Japan | 382/41 |

OTHER PUBLICATIONS

"High-Speed Shifter Array," IBM Tech. Disclosure Bulletin, vol. 21, No. 4, Sep. 78, pp. 1379-1380.
"Shift Register System for Image Orientation," IBM Tech. Disclosure Bull., vol. 18, No. 8, Jan. 76, pp. 2633-2639.
Walter R. Nordquist, "A Novel Rotate and Shift Circuit Using Bidirectional Gates," IEEE, Transactions on Computers, vol. C-19, No. 9, Sep. 70, pp. 802-808.

*Primary Examiner*—Gareth D. Shaw
*Assistant Examiner*—Viet Q. Nguyen
*Attorney, Agent, or Firm*—Blakely, Sokoloff, Taylor & Zafman

[57] ABSTRACT

An improved bit shifter to provide data block shifting in a graphics processor. The shifter allows a multiple word, data block shifting to be achieved simultaneously and independently of other graphic functions. The shifter provides character block transfer for rotation of characters of a display. The shifter also provides bit block transfers for moving data from a source location to a destination location.

23 Claims, 4 Drawing Sheets

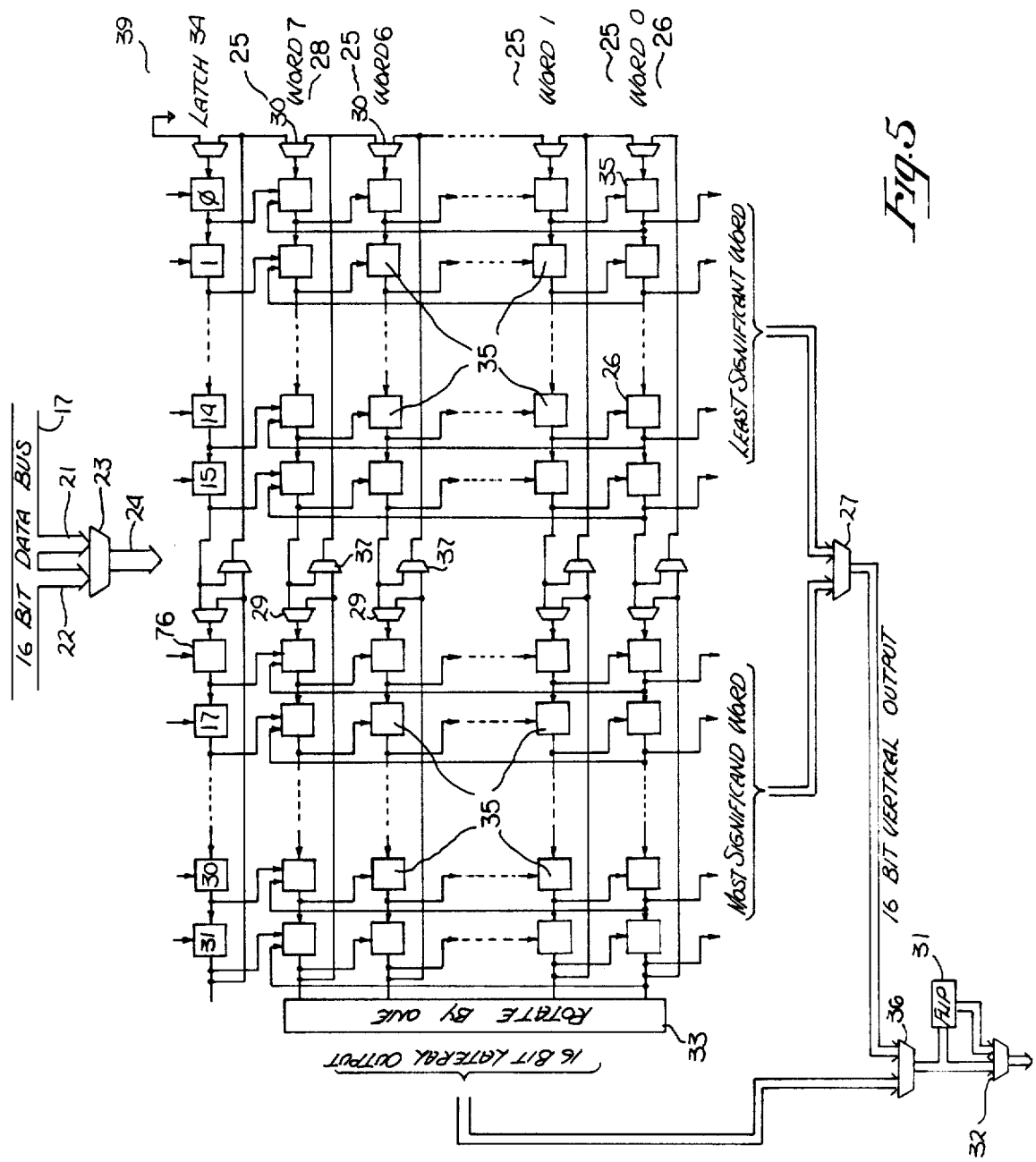

BLOCK SHIFTER FOR GRAPHICS PROCESSOR

BACKGROUND OF THE INVENTION

1. Field of the Invention.

The invention relates to a field of manipulating data stored in a memory and more specifically to shifting blocks of data stored in memory.

2. Prior Art.

There have been many graphics processors implemented in the past to process graphics data. A graphics processor must be capable of not only generating data, but also manipulating such data. Two typical operations involve rotation and shifting of video displays.

Normally a video display consists of raster lines having a number of pixels per line. A grouping of pixels, such as a 16×16 square, represents a character or a figure on the display. Each pixel information is represented by a bit (in a black and white display) or bits (in a color display). A 4-bit pixel will correspond to 16 shades of color.

A rotational operation allows a character to rotate on a display. This is useful when geometric figures need to be rotated. Prior art methods have used font tables in which all available characters are kept. The prior art method treated any rotated view of a character as a separate and unique character. Therefore, to provide 90, 180, and 270 degree rotation of a character, four fonts were necessary in the font table for each character.

A shifting operation allows a character to shift to a new position on a display. This is useful when a line or even a group of lines needs to be shifted to a new location. The prior art method employed a barrel shifting technique of shifting all bits a desired number of spaces.

The present invention describes a shifter which provides both a rotating and shifting operation to be performed in much faster time. Further, the invention provides for a manipulation of single word and multiple-word blocks of data.

SUMMARY OF THE INVENTION

An improved graphics data operation scheme providing for character block and bit block transfers is described. A character block transfer allows bits representing a block of pixels of a character to be rotated simultaneously. Therefore, only one font per character need be stored in a font table, because all rotational views will be accomplished by the character block transfer.

A second type of transfer, bit block transfer, allows a rectangular block of bits to be shifted simultaneously. Therefore, blocks of data may be shifted to a desired location much more quickly.

The present invention provides for shifting digital data in memory. A storage device which stores data from memory is configured as a matrixed array of registers. The shifter provides the register array to shift bits horizontally and vertically, as well as rotating them, thereby allowing for bits stored in the array to interchange positions. Then the manipulated data block is returned to memory by use of data transfer means. Character rotation is achieved by loading the block shifter with bits representing a character and performing a series of shifting operations provided by a rotating algorithm. Bit block transfer is achieved by loading successive bits and then shifting them into a corresponding bit position prior to a destination transfer.

The present invention was designed for the purpose of developing a single semiconductor integrated circuit chip having a total graphics capability. The chip contains a graphics processor of which the block shifter is an essential part. The chip also contains a display processor which is described in copending application entitled "WINDOW PROCESSOR FOR VIDEO DISPLAY", Ser. No. 828,626, filed Feb. 10, 1986, and an interface bus unit to manipulate 32-bit data transfers on a 16-bit bus which is described in copending application, entitled "PRIORITY LOGIC SYSTEM", Ser. No. 819,726, filed Jan. 17, 1986, both assigned to the assignee of the present invention.

BRIEF DESCRIPTION OF THE DRAWINGS

FIG. 5 illustrates the preferred embodiment of the present invention using a 8×32 matrixed array.

DETAILED DESCRIPTION OF THE PRESENT INVENTION

A bit block and character block shifter to manipulate multiple-word blocks of data is disclosed. The block shifter is used to speed the manipulation of graphics data in a graphics processor. The block shifter is implemented as a RAM array of 8×32 bits wherein a multiplexed 16-bit bus is utilized. Although a particular 8×32 matrix is utilized to process a 16×16 character display, it will be obvious to one skilled in the art that other matrices may be used, as well as different character displays. Also, certain specific details of the preferred embodiment are not required to practice the present invention. Further, well-known structures and circuits are not described in detail in order not to obscure the present invention in unnecessary detail.

Figure 1:
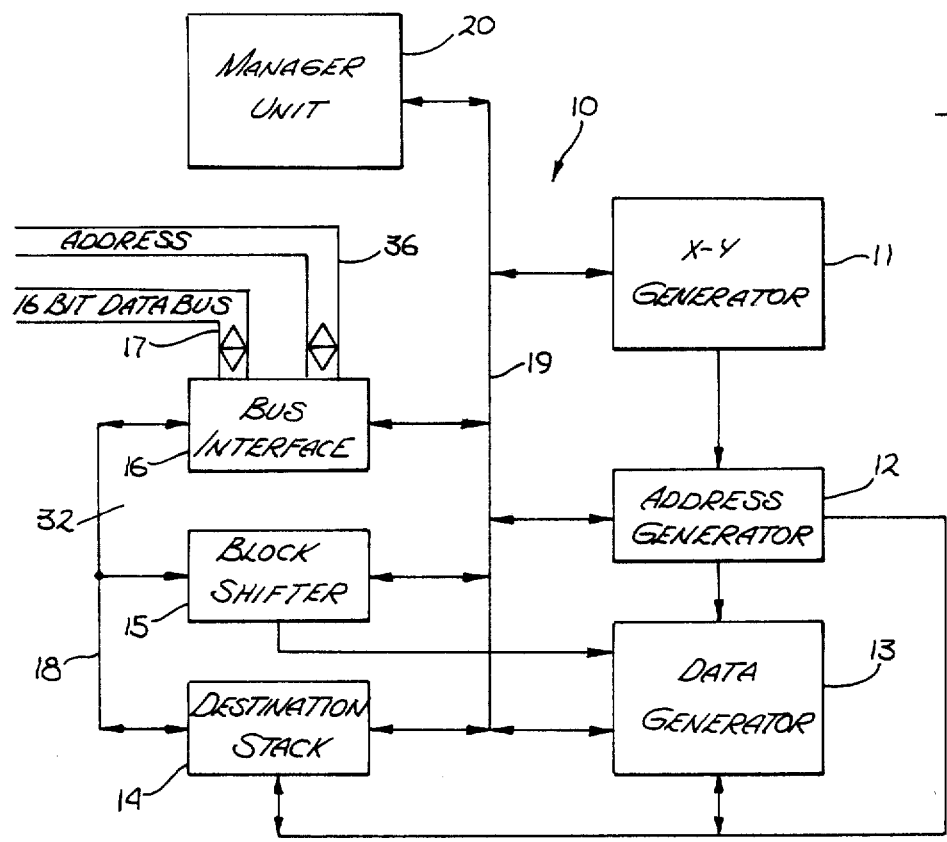
FIG. 1 is a block diagram illustrating the overall function of the block shifter of the present invention in reference to other units incorporated in a graphics processor.

Referring to FIG. 1, a basic block diagram of a graphics processor (GP) 10 is shown. An x-y generator 11, which is a programmable logic array state machine containing shape algorithms, provides next position ($\Delta x$ and $\Delta y$) information for use in generating lines, circles, etc. An address generator 12 coupled to x-y generator 11 provides the corresponding address in memory to each $\Delta x$ and $\Delta y$ next position information.

A data generator 13 coupled to address generator 12 provides the generation and processing of data. The data generator 13 determines what data need to be generated or modified and the particular modification to be achieved.

A 16-bit data bus 17 provides the interface between the GP 10 and other units such as the external memory (not shown). Bus 17 is a multiplexed bus which provides a 32-bit word transfer. Bus interface 16 accepts a most significant 16-bits and a least significant 16-bits to provide a 32-bit word on internal bus 18.

A block shifter 15 receives a sequence of 32-bit words of source data on bus 18 and provides the character block or bit block shift. Then the shifted data is coupled to data generator 13 for processing. While the block shifter 15 is operating on source data, destination stack 14 receives destination information on lines 18. The data is then sent to data generator 13 for operations to be performed with the shifted source data. Data generator 13 and address generator 12 provide the new data and respective addresses for the new data to destination stack 14. Destination stack 14 then couples data and address information to bus interface 16 for transmission on data bus 17 and address bus 36.

Data generator 13 also provides a choice of 16 Boolean functions of source data and destination data whenever desired. For example, when a bit is transferred from a source address to a new destination address, data generator 13 receives destination data from destination stack 14 and shifted source data from block shifter 15. Data generator 13 provides a Boolean function of the source and destination data and the output of the comparison is transferred to destination stack 14 as new destination data for transmission to memory via bus 17. Internal lines 19 coupling units 11, 12, 13, 14, 15 and 16 to manager unit 20 provides the internal control and communication between these units. The microcode for GP 10 resides in the manager unit 20 and is responsible for the initial start-up of The present invention resides in the block shifter 15. The block shifter 15 provides the necessary shifting operation of the block of words loaded into the block shifter 15. The block shifter 15 provides the character block transfer for rotation of a character and bit block transfer for shifting words to a new position on a display.

Figure 2:
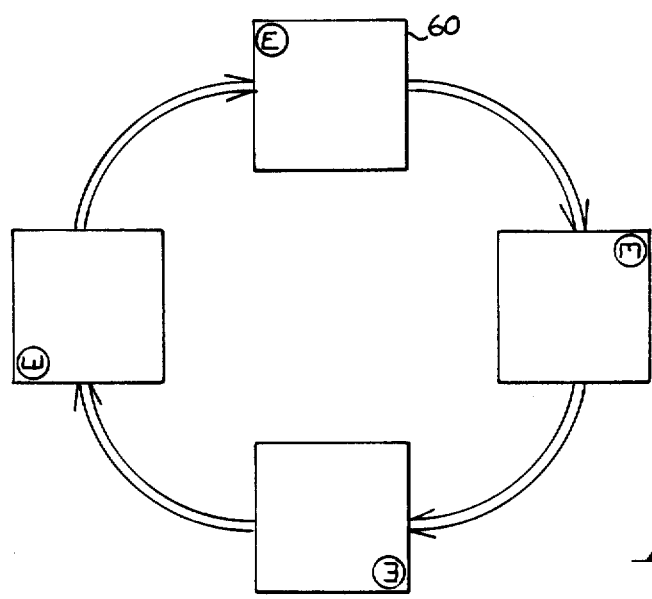
FIG. 2 is an illustration showing four view of a rotated character.

FIG. 2 illustrates a sample display of one character, such as a letter or a figure, being rotated. Each character is defined by a matrix of 16×16 pixels, represented as 16 words of 16 bits per word. The original 16×16 character 60 is rotated 90 degrees, 180 degrees or 270 degrees. The basic function of the block shifter 15 which allows the rotation of a 16×16 character is explained using the illustration of FIG. 3.

Figure 3:
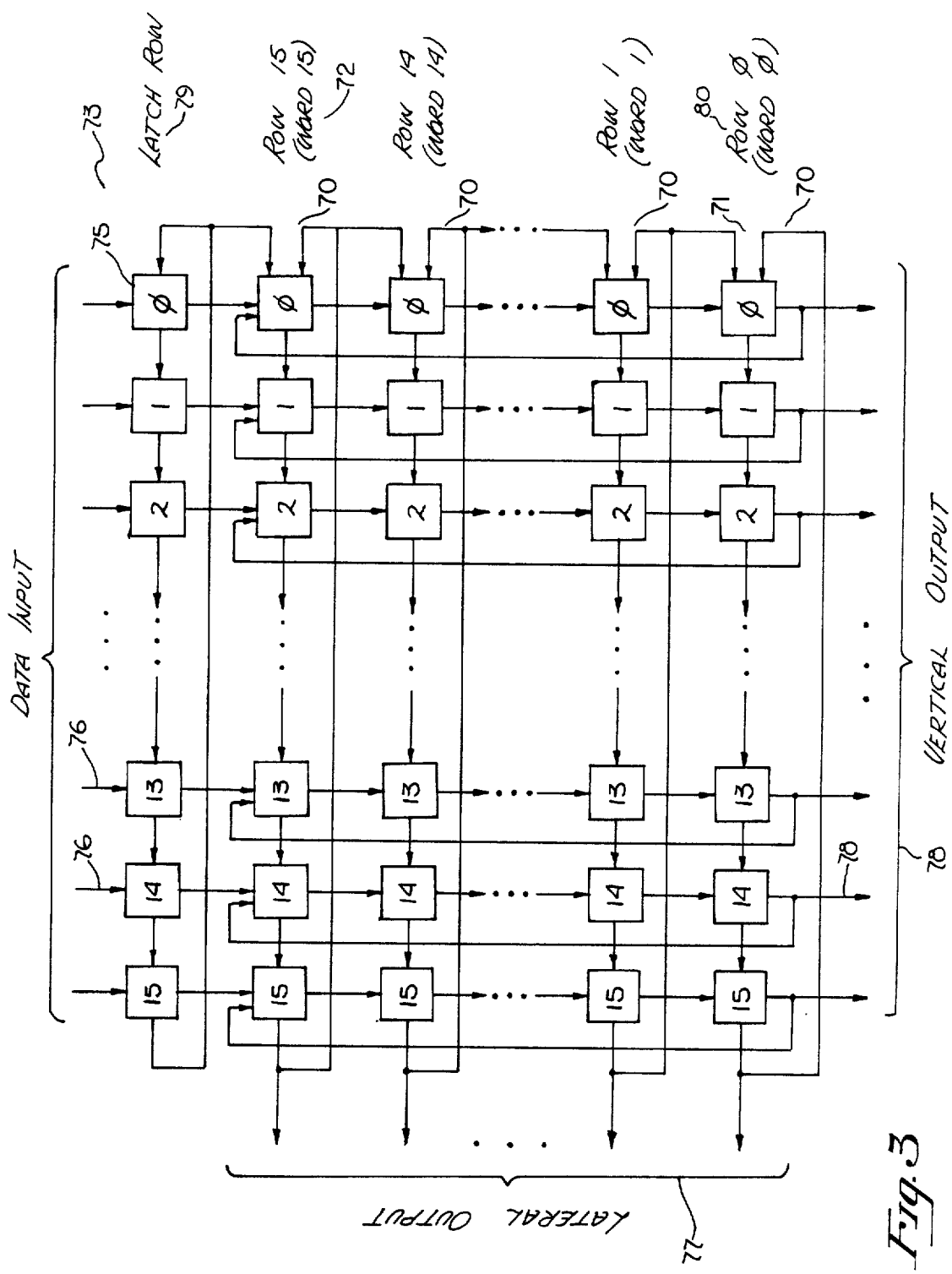
FIG. 3 is an illustration showing the functional layout of the block shifter using a 16x16 matrixed array.

Referring to FIG. 3, a functional block diagram illustrating the basic operation of the block shifter is shown. Sixteen rows (rows 0-15) of registers 70 are arranged as a stack, such that each row has a 16-bit register 70. Each bit of register 70 is coupled to the next significant bit of the same register (ex. bit 13 to bit 14) and also to the equivalent bit position of the next lower row (ex. bit 13 of row one to bit 13 of row zero). Row zero register 71 wraps back around to row 15 register 72. In each row, bit 15 is coupled to bit zero of the same row and to bit zero of the next lower row. The latch row is comprised of 16-bit register 75 and accepts a 16-bit word from memory. The latch register 75 is coupled similarly to row register 70 allowing for horizontal and vertical transition of bits and transition of its bit 15 to its bit 0 position as well as to bit 0 of row 15 register 72.

The block shifter 73 operates as a first-in, first-out (FIFO) stack. Block shifter 73 loads the first word into the latch register 75. These bits transcend downward as subsequent words are inputted to the latch row. This occurs until sixteen 16-bit words are loaded into the block shifter 73 in rows 0-15. The block shifter 73 derives its name from ts capability of performing simultaneous operation as a block of words. Once the data block is loaded into the block shifter 73, the bus is free to provide other functions while the block shifter 73 manipulates the stored data.

The character rotation is provided by shifting bits horizontally and vertically as determined by a prearranged algorithm. Once the rotation operation is completed, the bit pattern representing the rotated character is taken in sequential word order from lateral output 77 or vertical output 78.

Figure 4:
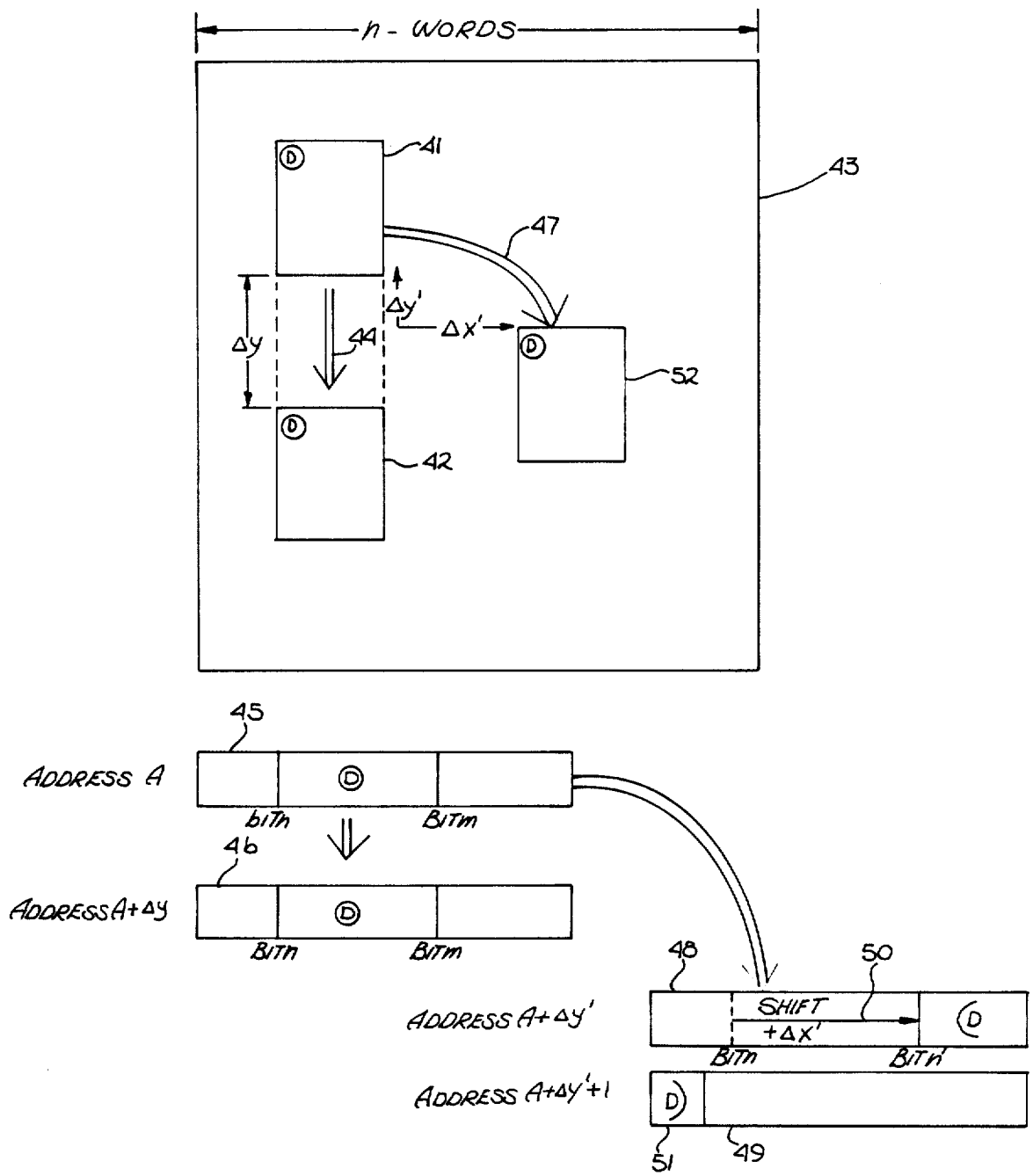
FIG. 4 is an illustration showing a bit block transfer.

FIG. 4 illustrates a shifting operation when a particular data at a source position 41 is to be transferred to a destination position 42 or 52. Two types of transfers can occur. Assuming that the display 43 is n-words long, a vertical transition 44 results in an address transition only to position 42. Bit n of source address 45 will transition to the same bit position (bit n) of destination address 46. A horizontal transition of complete word length also results in a similar address transition. Hence, in this type of source to destination transition where bit positions do not change, simply writing source data into a new address will suffice.

However, a second type of transition to position 52, involves a horizontal transition 47 of partial word lengths. This partial transition requires a shifting of bits between source address 45 and destination address 48. Further, the shift 50 may cause bits 51 to extend into the next address 49. For this type of source to destination transition to occur properly, bit block transition is implemented.

Referring again to FIG. 3, a block of sixteen words is loaded into block shifter 73. The sixteen words represent continguous segments of a display. The block shifter 73 provides for bit 15 of each row to be coupled to bit zero of the next lower row (ex. bit 15 of row one to bit zero of row zero). The sixteenth word when loaded into the latch row 79 is not stacked downward so that the sixteenth word is kept in latch register 75 and the bottom row 80 is kept open. The block shifter 73 then provides the necessary shift 50 (of FIG. 4) by shifting bits horizontally and sequencing the most significant bit to the least significant bit position of the next lower row. The use of the open bottom row 80 is evident in that bits will move into row 80 as the shifting occurs. The sixteen word block is then sent to the destination addresses with the proper shift 50. In a transition of serial data, sequential words may be inputted to the block shifter 15 as shifted words are removed from the bottom row 80 of block shifter 15.

Although the description uses a 16×16 matrix array, this was done primarily for ease of understanding. In actuality, the preferred embodiment uses an 8×32 matrix, wherein two sixteen bits words are placed alongside each other in a 32-bit word.

FIG. 5 shows a circuit diagram of the block shifter 15 of FIG. 1 as used in the preferred embodiment. Data bus 17 transfers least significant word (LSW) 21 and most significant word (MSW) 22 from memory. A multiplexer (MUX) 23 in the bus interface 16 (of FIG. 1) provides a single 32-bit word 24 to block shifter 39. The block shifter 39 is comprised of nine rows of registers 25, each row having 32 individual bit registers 35. Eight rows comprise the 8× =matrix for manipulating the 16×16 character data. The top row is a latch row 34, which is used for bit block shifting. Each bit is coupled to the next significant bit and also to the equivalent bit position of register 25 of the next lower level. Bits of word zero register 26 are coupled out to MUX 27 and also to the equivalent bit position of word 7. Therefore, word zero register 26 wraps back around to word 7 register 28.

In each row, bit 15 is coupled to its bit zero bit position by MUX 37 and 30 and to its bit 16 position by MUX 29. Bit 31 is coupled to bit 16 position by MUX 29 and to bit zero position by MUX 37 and 30. Therefore, each 16-bit half-word (MSW 22 or LSW 21) may wrap around itself or the complete 32-bit word may wrap around itself. The output of MUX 37 is also coupled to MUX 30 of the next lower row allowing for sequential shifting of bit 31 to bit zero position of the next lower row.

Hence, each data may transition vertically downward or horizontally to the next significant bit position. Also, a vertical and a horizontal wrap around may occur with an additional horizontal wrap around capability for each one-half word (LSW and MSW). Further, a squential shifting may occur, wherein a bit can continue a serial shift to the next lower row.

Because the block shifter 39 is an 8× =array, a sixteen-bit line of a 16×16 character is stored in the block shifter 39 as a sixteen-bit half-word. That is, the first line of a character is stored as an MSW of word zero and the second line stored as a LSW of word zero. To compensate for the horizontal layout (8×32), instead of the stacking (16×16), a rotate-by-one circuit 33 is implemented. A rotate by one circuit 33 coupled to bit 31 of each row allows for the MSW and LSW of each row to exchange positions, thereby providing for the shifting capability of each half-word. Any prior art store and shift circuit may provide this rotate function.

In the character rotation function, a sixteen-bit output can be taken from either the lateral output (bit 31 of each row) or the vertical output (word 0) of the block shifter 39. MUX 27 multiplexes the 32-bit word from last row register 26 into two sixteen-bit words. MUX 36 selects the 16-bit output of either the vertical or the lateral output. For particular rotations of characters, the rotate algorithm requires the pattern to be completely reversed so that the most significant bit becomes the least significant bit and vice versa. This reversal is accomplished by flip circuit 31. The flip circuit will cause the 16 bits from the output of MUX 36 to be flipped (reversed) and MUX 32 selects between the flip or non-flip data. The output of MUX 32 is then coupled to the data generator 13 of FIG. 1.

Thus, an improved graphics data operating scheme providing for character block and bit block transfers has been described. The novelty of the invention resides in the rapid multiple word (block) manipulation of data in the block shifter. The independent operation of the block shifter permits other units of the graphics processor to function while the block shifter is performing, thereby providing a more rapid graphics capability.

I claim:

1. In data processing system, an apparatus for shifting video pixel data stored in a memory, comprising:
   storage means for storing a plurality of selected bits from said memory and said storage means configured as a matrixed array of individual registers, such that each individual register is coupled to all adjacent registers to provide for shifting an array of video pixel data in any direction along any dimension of said array;
   shifter means coupled to said storage means for interchanging positions of said bits by vertically and horizontally shifting each of said video pixel data by one position at a time within said array such that said bits which are located at the edges of said matrixed array have two possible transitions, an output transition allowing for shifting to said memory, and a wrap around transition allowing for shifting and rotating back into said storage means forming a circular loop;
   transfer means coupled to said storage means and said memory for transferring said video pixel data as a sequence of words having a horizontal transition and a vertical transition;
   whereby a block shifting of data in said memory is achieved.

2. The apparatus as defined in claim 1, wherein said registers of said array configured in a plurality of rows stacked one above another, such that each row register of said array stores a word from said memory and horizontally shifts bits of said word.

3. The apparatus as defined in claim 2, wherein each said word enters at a first row of said array and a shifted word exits at a last row of said array.

4. The apparatus as defined in claim 3, wherein said register of each row is coupled to said register of next lower row such that said bits of each row transfers vertically to equivalent bit positions of next lower row.

5. The apparatus as defined in claim 4, wherein said register of said last row is also coupled to registers of said first row such that said bits of said last row transfer to equivalent bit positions of said first row, such that each such position loops vertically.

6. The apparatus as defined in claim 5, wherein a most significant bit position of each row register is coupled to its least significant bit position, such that said bits of each row transition in a horizontal loop.

7. The apparatus as defined in claim 6, wherein said most significant bit position of each row register is also coupled to said least significant bit position of next lower row such that said bits transition serially through said array.

8. The apparatus as defined in claim 7, wherein said array having sixteen row registers and each register storing a 16-bit word.

9. The apparatus as defined in claim 7, wherein said array having eight row registers of 32-bit length and storing two 16-bit words.

10. The apparatus as defined in claim 9, further including multiplex means coupled to each row, wherein each said multiplex means has the ability to select horizontally looping each said 16-bit word, such that bit position 15 is transferred to bit position 0 and bit postion 31 is transferred to bit position 16, and horizontally looping all 32 bits of each said row, such that bit position 31 is transferred to bit position 0.

11. The apparatus as defined in claim 10, wherein said array having a lateral output of 8 bits from most significant bit positions of each said row and two 16-bit vertical outputs from said last row.

12. In a data processing system, a shifter for shifting digital data in a memory, said shifter comprising;
   latch means for accepting said data from said memory, said latch means capable of entering said data either horizontally or vertically;
   an array of registers, coupled to said latch means, said array arranged in a row and column matrix, each row comprising of registers to store a word as individual bits from said memory, such that each said individual bit register is coupled to all adjacent registers to provide for shifting said data in any direction along said rows and said columns;
   control means coupled to said array for shifting said data in said array, said control means selecting the routing of bits either in circular looping where each horizontally shifting bit remains in the same row and each vertically shifting bit remains in the same column, or full block shifting where the most significant bit is horizontally shifted to the least significant bit position of the next row and each vertically shifting bit moves one row down in the same column except for the last row where very vertically shifting bit moves to the same column position of the first row;

output means coupled to said array for transferring an output of said array to said memory, said output means selecting either lateral output by sending the most significant bit from each of said rows that comprise the first column or vertical output by sending each bit from the last row;

whereby a more rapid character block and bit clock transfers are achieved.

13. The shifter as defined in claim 12, wherein said array having a first row coupled to said latch means and a last row coupled to said output means, such that said data enters at said first row and a shifted data exits at said last row.

14. The shifter as defined in claim 13, wherein each bit position of a row register is coupled to each equivalent bit position of a row register of the next lower row and each bit position of the row register of said row is coupled to each equivalent bit position of the row register of said first row, such that bits in each column shift in a vertical loop.

15. The shifter as defined in claim 14, wherein a most significant bit position of each row register is coupled to its least significant bit position, such that bits in each said row shift in a horizontal loop.

16. The shifter as defined in claim 15, wherein said most significant bit position of each row register is also coupled to said least significant bit position of next lower row such that said bits transition serially through said array.

17. The shifter as defined in claim 16, wherein said latch means further including a latch row register, said latch row register coupled to equivalent bit positions of said first row register to transition said bits vertically down said column, said latch row register also having its most significant bit position coupled to its least significant bit position and to least significant bit position of said first row, such that said bits in said latch row looping horizontally as well as transitioning serially.

18. The shifter as defined in claim 17, wherein said array having eight rows of 32 bits in length to store two 16-bit words.

19. The shifter as defined in claim 18, further including first multiplex means coupled to each said row wherein each said multiplex means is for selecting between horizontally looping each said 16-bit word and horizontally looping all 32 bits of each said row.

20. The shifter as defined in claim 19, wherein said latch means further including a second multiplex means for receiving two 16-bit words and for providing a 32-bit word to said latch row registers.

21. The shifter as defined in claim 20, wherein said output means for further providing a lateral output from most significant bits of each said row and two 16-bit vertical outputs from said last row and a third multiplex means for selecting one of said outputs.

22. The shifter as defined in claim 21, further including a flip circuit coupled to said output means to reverse a bit pattern of said outputs.

23. The shifter as defined in claim 17, wherein said array having 16 rows of 16 bits per said row.

* * * * *